UNITED STATES PATENT OFFICE.

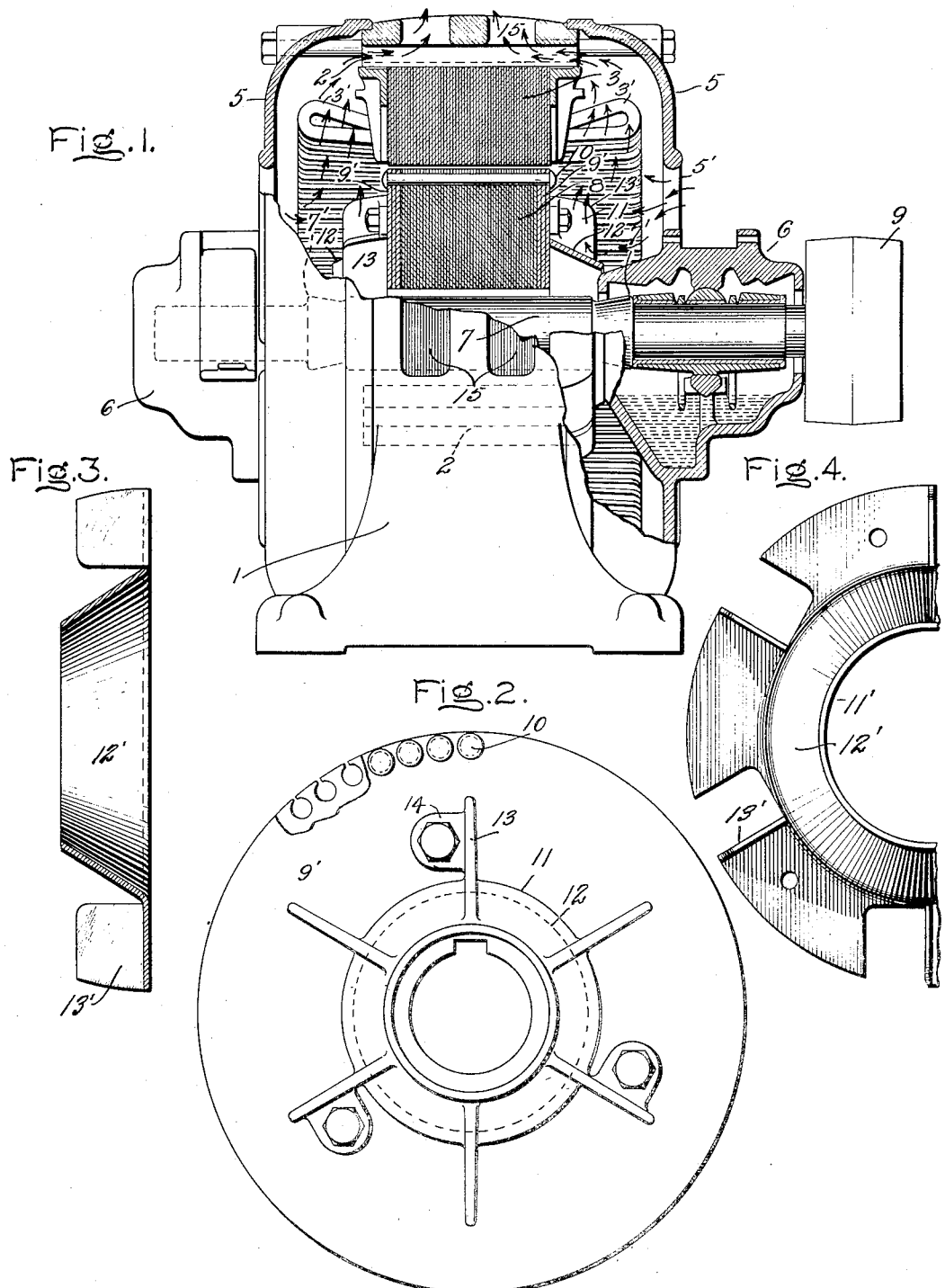

HENRY G. REIST, OF SCHENECTADY, NEW YORK, ASSIGNOR TO GENERAL ELECTRIC COMPANY, A CORPORATION OF NEW YORK.

VENTILATING DYNAMO-ELECTRIC MACHINES.

No. 856,423.     Specification of Letters Patent.     Patented June 11, 1907.

Application filed March 1, 1905. Serial No. 247,851.

*To all whom it may concern:*

Be it known that I, HENRY G. REIST, a citizen of the United States, residing at Schenectady, county of Schenectady, State of New York, have invented certain new and useful Improvements in Ventilating Dynamo-Electric Machines, of which the following is a specification.

My present invention has for its object improvements in means for ventilating dynamo electric machines, through air currents generated by the revolution of the rotating member of the machine.

The various features of novelty which characterize my invention are pointed out with particularity in the claims annexed to and forming a part of this specification. For a better understanding of my invention, however, reference may be had to the accompanying drawings and description in which I have illustrated and described forms in which my invention may be embodied.

Referring to the drawings, Figure 1 is an elevation with the parts broken away and in section of a dynamo electric machine embodying my invention; Fig. 2 is an end elevation of the body of the rotating member of the machine shown in Fig. 1; and Fig. 3 is an end elevation and Fig. 4 a view at right angles thereto showing a modified detail of construction.

Referring to the drawings, 1 represents the frame or casing of an induction motor embodying my invention. The inner periphery of the frame is provided with a number of parallel projections or ribs against the inner face of which the annular stator core 3 is secured by means of dovetail connections or otherwise. It will be observed that the arrangement is such that arc-shaped spaces are formed between the outer periphery of the core 3, the inner periphery of the frame 1, and the projections or ribs 2.

To the ends of the frame 1 are secured the usual end members or bonnets 5. The bonnets 5 are each provided with a bearing box 6 in which suitable bearings are supported for the shaft 7 of the rotor. The shaft 7 has tapered portions terminating in oil-throwing ridges 7' located one in each box. These tapered portions and ridges are intended to operate to prevent the flow of oil along the shaft out of the bearing boxes in the usual manner. Between the inner ends of the bearings is located the rotor core 8 which is keyed to the shaft 7. One extended end of the shaft 7 carries a power transmitting pulley 9.

The rotor core proper is made up of laminæ of magnetic material which are keyed to the shaft. At the ends of the core proper are sheet copper disks 9' which serve as the end connections for the heavy bar conductors 10, the ends of which may be upset as shown to hold them in place. Against each end of the rotor core 8 in the construction shown in Figs. 1 and 2 is secured a member 11 which may be formed of cast metal. The member 11 is formed with a portion, part or member 12 in the shape of a truncated cone, the base of which bears against the corresponding end of the core 8. The smaller and outer end of each portion 12 terminates in or near the radial plane touched by the inner end of the corresponding bearing box 6. In the construction shown in the drawings the outer end of each portion 12 projects outward slightly beyond the inner end of the corresponding bearing box 6, the outer diameter of which at that point is slightly less than the inner diameter of the small end of the portion 12. The member 11 is also provided with integral outwardly-extending fan blades, vanes or wings 13 which may be located in radial planes as shown, or may be inclined to such planes if desirable. Ears 14 projecting at right angles to the bodies of some of the blades 13 are provided with perforations through which pass the bolts employed to secure the members 11 to the core. It will be observed that the members 11 are placed so that when suitably proportioned they may serve as the end members of the rotor core proper between which the laminæ of the core may be clamped.

The rotation of the shaft 7 and core 8 causes air currents to be generated by the fan blades 13, which flow outward through the end connections of the windings 3' of the stator. The air thus moved may enter the motor casing through openings 5' in the bonnets 5, and may flow outward through openings 15 in the motor frame proper. The openings 15 it will, of course, be understood communicate with the spaces between the core 3 and the periphery of the motor frame. The air thus moved not only cools the stator core and windings, but also cools the rotor core very effectually as the air currents generated are driven radially along the copper disks 9' and the ends of the conductor bars 10. The rotor is also cooled by reason of the fact that the members 11 are in direct engagement with the outer disks 9', which being formed of copper conduct heat rapidly from the core and its conductors to the members 11, thus materially increasing the heat radiating surface of the rotor. The portions 12 of the members 11 serve as shields, barriers or guards to prevent oils being sucked out of the bearing boxes by the fan blades. It is not essential in all cases that the portions 12 be conical as shown, though with the construction illustrated in the drawing it is desirable that they should be so shaped, as they then guide the air currents generated by the fan blades into the proper outward paths.

The construction shown in Figs. 3 and 4 is substantially like that shown in Figs. 1 and 2 with the exception that the member 11' corresponding to the member 11 of the first described construction is formed out of sheet metal, the conical portion 12' being spun up and the fan blades 13' being in the form of projections turned at right angles from an outward radial extension from the large end of the conical portion 12'.

It will be obvious to all those skilled in the art that the construction which I have described is simple and efficient and that many changes may be made in the form in which my invention is employed without departing from its spirit. In particular it is obvious that the invention may be advantageously employed with other machines than induction motors.

What I claim as new and desire to secure by Letters Patent of the United States, is:

1. In a dynamo electric machine, a rotating body, fan blades carried by the ends thereof, bearings for the body, and guards or shields extending from the body to the bearings.

2. In a dynamo electric machine, a rotating shaft, a bearing therefor, a core or body carried by the shaft, fan blades secured to the end of the core or body adjacent the bearing, and a shield carried by the core and extending to the bearing.

3. In a dynamo electric machine, a rotating shaft, a core or body carried thereby, a member secured thereto provided with fan blades or vanes, and a barrier integrally connected thereto and extending from the core to the bearing.

4. In a dynamo electric machine, an external stationary core, an internal rotating core or body, a shaft carrying said rotating core or body, bearings for the shaft and members secured to each end of the core body, each of said members comprising fan blades or vanes, and a guard or barrier portion which extends to the bearing to prevent the air currents produced by the fan blades from drawing oil out of the bearings.

5. In an induction motor, a stationary core, end members in fixed relation thereto, each of said end members being provided with an inwardly projecting bearing box, a rotating shaft and bearings therefor in said bearing boxes, a rotating core carried by the shaft in co-operative relation with the stationary core, shell-like members projecting from each end of the core which extend over the ends of the corresponding bearing boxes, and fan blades carried by the rotating core without the shell members.

6. In a dynamo electric machine, a rotating shaft, a bearing therefor, a core or body carried by the shaft, fan blades secured to said body adjacent the bearing, and a shield carried by the core and overhanging the bearing.

7. In a dynamo electric machine, a casing, bearing boxes projecting therein and carried by the ends of said casing, a shaft journaled in said bearing boxes, a core body carried by the shaft, shells in the form of truncated cones secured one to each end of the core body, the base end of each cone being adjacent the core and the smaller end of each shell surrounding the inner end of the corresponding bearing box, and fan blades secured to each end of the core body externally of the shell members.

8. In an induction motor, a frame member, a stationary core supported thereby, end members secured to opposite ends of said frame member, each of said end members being provided with an inwardly projecting bearing box, a rotating shaft journaled in said bearing boxes, a rotor core carried by the shaft in co-operative relation with the stationary core, shell-like projections or members from each end of the core, which project over the ends of the corresponding bearing boxes, conductors carried by the rotor core and end connections therefor engaging said shell members, and fan blades carried by the rotor core externally of the shell members.

In witness whereof I have hereunto set my hand this 16th day of February, 1905.

HENRY G. REIST.

Witnesses:
BENJAMIN B. HULL,
HELEN ORFORD.